United States Patent
Sloss (10) Patent No.: US 10,816,652 B2
(45) Date of Patent: Oct. 27, 2020

(54) METHOD OF COMPRESSING SONAR DATA

(71) Applicant: Martyn Sloss, Fife (GB)

(72) Inventor: Martyn Sloss, Fife (GB)

(73) Assignee: CodaOctopus Group, Orlando, FL (US)

( * ) Notice: Subject to any disclaimer, the term of this patent is extended or adjusted under 35 U.S.C. 154(b) by 242 days.

(21) Appl. No.: 15/908,395

(22) Filed: Feb. 28, 2018

(65) Prior Publication Data

US 2019/0265343 A1    Aug. 29, 2019

(51) Int. Cl.
| | | |
|---|---|---|
| *G01S 7/526* | (2006.01) | |
| *G01S 15/06* | (2006.01) | |
| *G01V 1/18* | (2006.01) | |
| *G01S 15/89* | (2006.01) | |
| *G01S 15/42* | (2006.01) | |
| *G01S 7/533* | (2006.01) | |

(52) U.S. Cl.
CPC ............ *G01S 7/526* (2013.01); *G01S 7/533* (2013.01); *G01S 15/06* (2013.01); *G01S 15/42* (2013.01); *G01S 15/89* (2013.01); *G01V 1/186* (2013.01)

(58) Field of Classification Search
CPC .......... G01S 15/42; G01S 7/526; G01S 15/06; G01S 7/533; G01S 15/89; G01V 1/186
USPC ...................................... 367/15, 87, 99, 103
See application file for complete search history.

(56) References Cited

U.S. PATENT DOCUMENTS

| | | | | |
|---|---|---|---|---|
| 7,907,079 B1* | 3/2011 | Galloway | ........... | H03M 1/1014 341/155 |
| 2010/0331689 A1* | 12/2010 | Wegener | .................. | A61B 8/06 600/443 |
| 2017/0315237 A1* | 11/2017 | Steenstrup | .............. | G01S 7/533 |

* cited by examiner

*Primary Examiner* — Daniel L Murphy
(74) *Attorney, Agent, or Firm* — Rodney T. Hodgson (57) ABSTRACT

In a sonar system using a large array multielement sonar detector, the raw phase and intensity data is reduced to less than three bits per channel per slice for each of the detectors in the multielement array before the raw data is transmitted to a beamformer for transforming the data to information about the spatial positions of objects reflecting the sonar signals.

8 Claims, 13 Drawing Sheets

Average Slice Intensity vs Slice Number

12 Bit

MAX

Fig. 7A

FAT

Fig. 7B

MAX

Fig. 7C

FAT

ADC Circuit

Fig. 9A 1 bit Comparator circuit

Fig. 9B 2 bit Comparator circuit

|     |     |     |     | 3BitNo |     |     |       |      |
| --- | --- | --- | --- | --- | --- | --- | ----- | ---- |
| R+  | R-  | I+  | I-  | B2  | B1  | B0  | Phase | Ampl |
| 0   | 0   | 0   | 0   | 0   | 0   | 0   | 45    | 0    |
| 0   | 0   | 0   | 1   | 1   | 0   | 1   | 135   | 1    |
| 0   | 0   | 1   | 0   | 1   | 0   | 0   | 45    | 1    |
| 0   | 0   | 1   | 1   | 1   | 0   | 1   | 135   | 1    |
| 0   | 1   | 0   | 0   | 1   | 1   | 0   | 225   | 1    |
| 0   | 1   | 0   | 1   | 1   | 1   | 1   | 315   | 1    |
| 0   | 1   | 1   | 0   | 1   | 1   | 0   | 225   | 1    |
| 0   | 1   | 1   | 1   | 1   | 1   | 1   | 315   | 1    |
| 1   | 0   | 0   | 0   | 1   | 0   | 0   | 45    | 1    |
| 1   | 0   | 0   | 1   | 1   | 0   | 1   | 135   | 1    |
| 1   | 0   | 1   | 0   | 1   | 0   | 0   | 45    | 1    |
| 1   | 0   | 1   | 1   | 1   | 0   | 1   | 135   | 1    |
| 1   | 1   | 0   | 0   | 1   | 1   | 0   | 225   | 1    |
| 1   | 1   | 0   | 1   | 1   | 1   | 1   | 315   | 1    |
| 1   | 1   | 1   | 0   | 1   | 1   | 0   | 225   | 1    |
| 1   | 1   | 1   | 1   | 1   | 1   | 1   | 315   | 1    |

METHOD OF COMPRESSING SONAR DATA

RELATED PATENTS AND APPLICATIONS

The following US Patents and US patent applications are related to the present application: U.S. Pat. No. 6,438,071 issued to Hansen, et al. on Aug. 20, 2002; U.S. Pat. No. 7,466,628 issued to Hansen on Dec. 16, 2008; U.S. Pat. No. 7,489,592 issued Feb. 10, 2009 to Hansen; U.S. Pat. No. 8,059,486 issued to Sloss on Nov. 15, 2011; U.S. Pat. No. 7,898,902 issued to Sloss on Mar. 1, 2011; U.S. Pat. No. 8,854,920 issued to Sloss on Oct. 7, 2014; and U.S. Pat. No. 9,019,795 issued to Sloss on Apr. 28, 2015. U.S. patent application Ser. Nos. 14/927,748 and 14/927,730 filed on Oct. 30, 2015 by Sloss are also related to the present application.

The above identified patents and patent applications are assigned to the assignee of the present invention and are incorporated herein by reference in their entirety including incorporated material.

FIELD OF THE INVENTION

The field of the invention is the field of transmission and/or storage of sparse data from sonar signals scattered from surfaces.

OBJECTS OF THE INVENTION

It is an object of the invention to measure analogue signals received from a hydrophone array, and to convert data from the measured analog signals to a greatly reduced set of digital data signals before signals are sent to a sonar beamforming system or sent to a digital storage device.

SUMMARY OF THE INVENTION

One or more objects immersed in a fluid are imaged by directing a sonar pulse at the object and recording sonar signals reflected from the object with a sonar imaging array. The data calculated from the reflected sonar signals is used to produce a sonar image of the object. Raw data from the sonar imaging array is sent to a beamformer which converts the phases and intensities of the interfering reflected sound waves measured by the sonar imaging array into points in physical space where the objects reflect the sonar pulse. The beamformer is advantageously separated from the sonar array, and the data link between array and beamformer may have limited data transmission bandwidth. The sonar array is advantageously contained in a remotely operating vehicle (ROV), which may have a limited data recording capability. In both cases, the raw data is advantageously treated to greatly reduce the amount of raw data transmitted or stored while degrading the final beamformed sonar image only slightly.

DETAILED DESCRIPTION OF THE INVENTION

It has long been known that data presented in visual form is much better understood by humans than data presented in the form of tables, charts, text, etc. However, even data presented visually as bar graphs, line graphs, maps, or topographic maps requires experience and training to interpret them. Humans can, however, immediately recognize and understand patterns in visual images which would be impossible for even the best and fastest computers to pick out. Much effort has thus been spent in turning data into images.

In particular, images which are generated from data which are not related to light are difficult to produce. One such type of data is sonar data, wherein a sonar signal pulse is sent out from a generator into a volume of fluid, and reflected sound energy from objects in the insonified volume is recorded by one or more detector elements. The term "insonified volume" is known to one of skill in the art and is defined herein as being a volume of fluid through which sound waves are directed. In the present invention, a sonar signal pulse of sound waves called a ping is sent out from a generator which insonifies a roughly conical volume of water.

Figure 1:
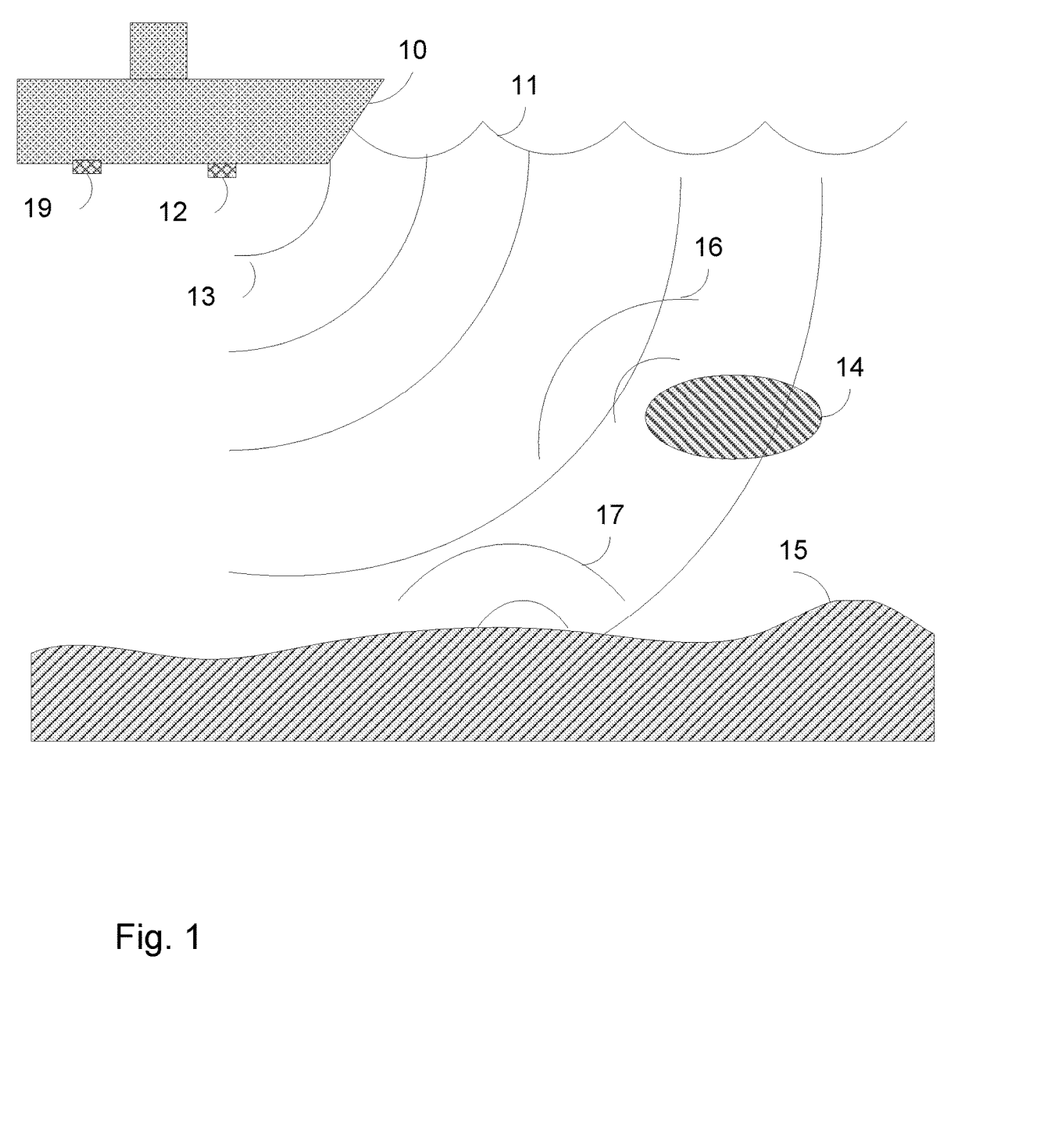
FIG. 1 shows a sketch of a sonar source sending sonar wave to a surface and a sonar array receiving device receiving reflected sonar signals from the surface.

FIG. 1 shows a sketch of a vessel 10 carrying an ultrasonic sonar generator or ping generator 12 under the water. The outgoing sound waves 13 of an outgoing ping impinge on an object 14 suspended in the water, sound waves 16 are reflected back towards a multielement sonar detector 19. Object 14 may be suspended in the water, lying on the seabed 15, or be buried in the sea bed 15. Sound waves 17 are also shown reflected from the seabed 15 towards the sonar detector 19. Sound waves 16 and 17 may also be rereflected (not shown) from the surface 11 of the water. A series of outgoing ping pulses may be sent out with an outgoing ping frequency $P_f$. A sonar ping generally has a constant sound frequency f. (The frequency f is sometimes changed in the prior art during the ping in a method called a chirped pulse ping, where the pulse frequency either increases or decreases monotonically throughout the pulse.) A master oscillator (not shown) produces a square wave voltage output at frequency f, and the ping generator uses the master oscillator to produce outgoing sinusoidal sound waves in phase with the master oscillator. The outgoing ping length $l_p$ and the outgoing ping time $t_p$ are related by the speed of sound in the water. A convenient outgoing ping length $l_p$ is about 15 meters.

A series of outgoing ping pulses may be sent out with a ping frequency $P_f$. Sound waves 13 are shown propagating as a cone shaped beam towards the object 14. The reflected sound waves 16 are received by each detector element of the multielement sonar detector array 19, which measures the pressure of the reflected ping sound waves at each element and returns an analog electrical voltage signal representing the amplitude versus time of the sound wave impinging on the element.

The reflected ping signals may be subdivided into a series of slices having a slice time $t_s$.

The analog electrical voltage signal from each element is digitized and treated to give raw data of representing the reflected sonar wave phase and intensity at each of the multielement detectors.

The master oscillator square wave is used to provide pulses at frequency $4f$ timed to the edges of the master oscillator square wave, so the received signal at each detector is sampled at phases 0, 90, 180, and 270 degrees of the master oscillator. The samples at 0 and 180 degrees give the real parts, and at 90 and 270 degrees the imaginary parts of the phase of the reflected sound wave with respect to the master oscillator.

The reflected ping signals may be subdivided into a series of slices having a slice time $l_s$ and a slice length $l_s$. A convenient slice length $l_s$ is 4 cm. and a convenient ping length $l_p$ is about 15 meters.

The digitized data is then transformed with a beamformer program to provide points in three dimensional space polar coordinates as a function of range and of two orthogonal angles from the detectors. These points in polar coordinate space are in turn generally presented as data in a three dimensional Cartesian coordinate space. The point data may then be presented as height above the sea bed, for example, or depth below the surface, as a "z" coordinate, while the x and y coordinates could be chosen as west and north, for example. In other examples, the x or y coordinate could be chosen to be parallel to a wall or other long, mostly straight object.

One characteristic of sonar data is that it is very sparse, as the insonified volume is generally water having only one or a few objects of interest. The volume of the fluid is generally divided into a series of cubes in three dimensional Cartesian coordinate space, and data is returned from a small percentage of the cubes having sides of length $l_s$. The resolution of the sonar image is inversely proportional to the linear dimension $l_s$ of the cubes, while the computation cost of recording the signal from each detector element and calculating from whence the signals have come is inversely proportional to the cube dimensions to the third power. There is then a tradeoff between resolution and computer power and time taken to produce an image from received data.

In other electromagnetic or ultra sound imaging technologies, the data are very dense. In an art unrelated to sonar imaging, medical imaging essentially has signals from each voxel, and the techniques for such imaging as CT scans, MRI scans, PET scans, and Ultrasound Imaging is not applicable to the sparse sonar data. In the same way, signals from sound waves sent out from the earth's surface into the depths of the earth to return data of rock formations in the search for oil and gas produce dense data, and techniques developed for such fields would not in general be known or used by one of skill in the art of sonar imaging.

The present invention is used to reduce the amount of raw data from a sonar detecting array that is sent to the beamformer section or to a data storage system in, for example, a remotely operated vehicle (ROV). The beamformer, which in the prior art receives uncompressed data in the form of phase and amplitude information about the reflected sound waves would then compress the data greatly in the process of providing a three dimensional spacial map of the positions of objects scattering the sound waves back to the multielement detector. For example, for each resolution element of the discrete value of the two orthogonal angles, just one range would be returned by the beamformer. Normally, either the "first above threshold" (FAT) intensity signal, or the maximum intensity (MAX) signal would be chosen to give a range of a single resolution element for any particular values of the two orthogonal angles. Setting the threshold of the FAT signal could, for example, ignore the signal from a fish with soft tissue and less reflectivity than a metal object or the seabed. Enormous amounts of data would then be discarded where, for example, less intense signals that were returned from other ranges would be ignored.

Figure 2:
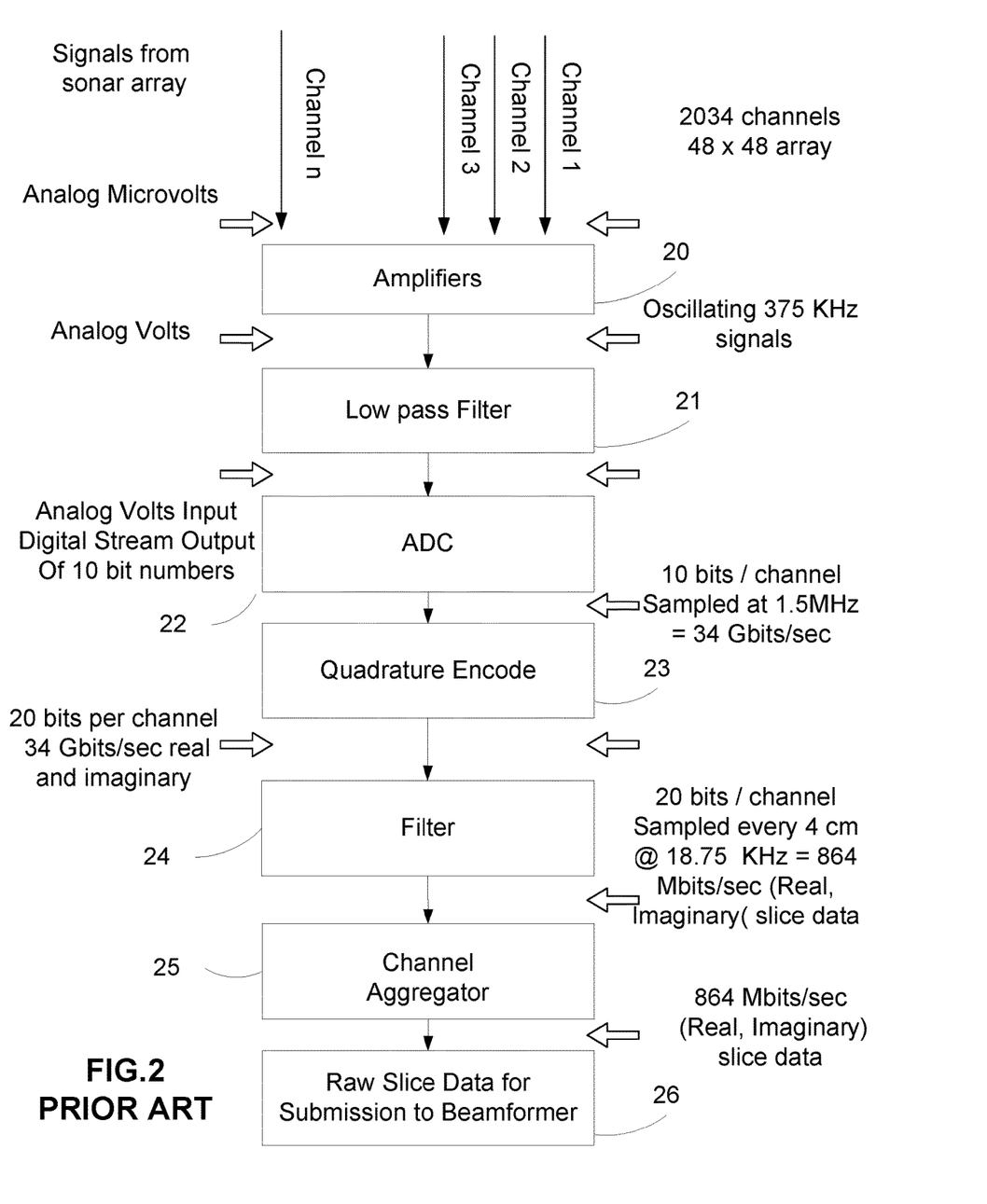
FIG. 2 shows a Prior Art flow detailing the process steps in receiving analog electrical signals from a large array of hydrophones and producing a raw data set of digital data for transmission to a beamformer device.
Figure 3:
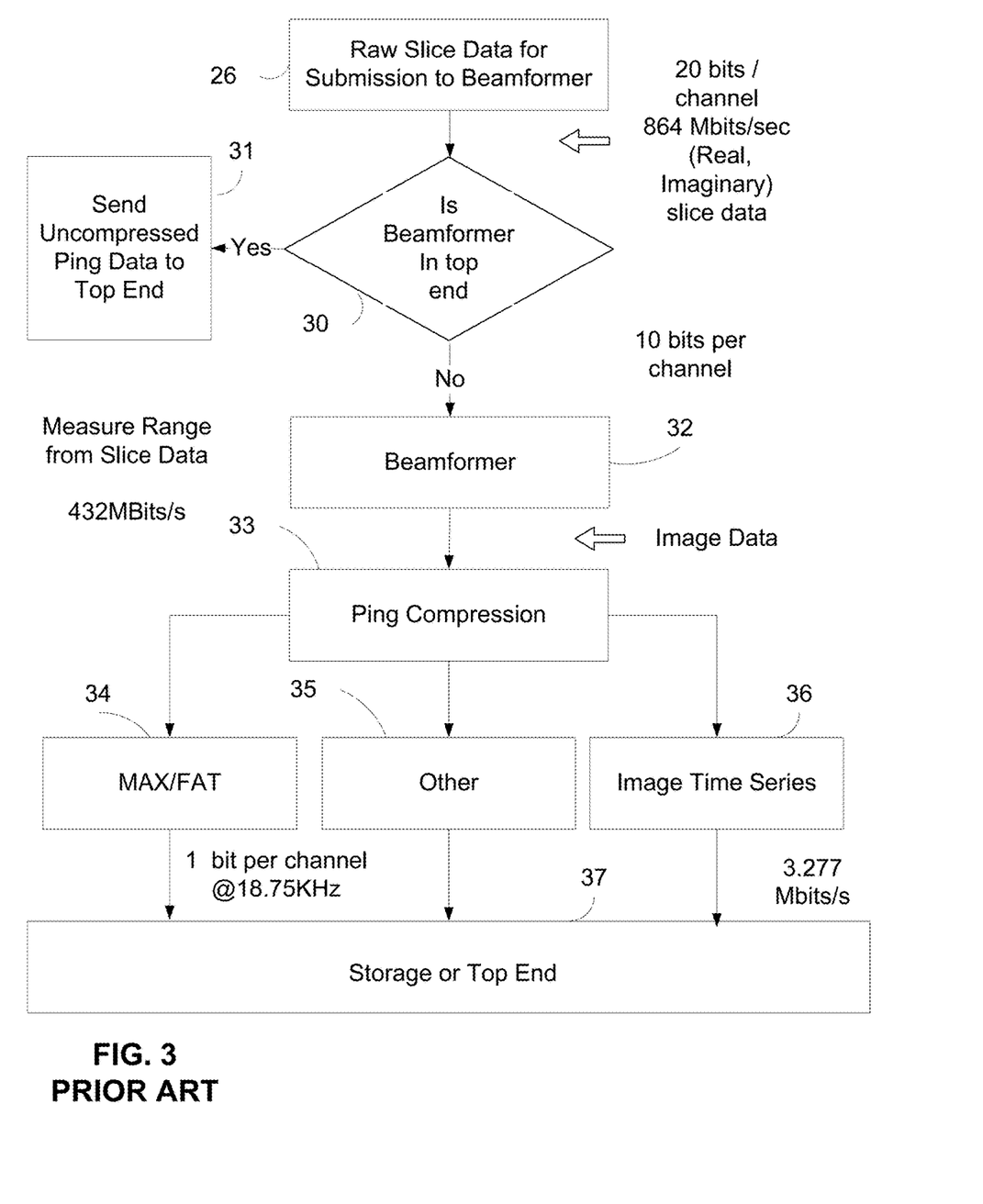
FIG. 3 shows a Prior Art flow chart detailing the process steps in receiving raw digital data from a large array of hydrophones and producing a sonar image with a beamformer.

Signal reception and processing in the prior art is shown in the flow charts depicted in FIGS. 2 and 3. The sonar receiving array 19 comprises a piezo electric material sandwiched between two electrodes. One electrode is etched to provide an array of electrodes. (In the example discussed in this section the array is 48 by 48 elements each having dimensions approximately 3.5 by 3.5 mm, and with a separation between the individual electrodes of 0.5 mm.) Pins are attached to each 3.5 by 3.5 mm element in the array, and the pins in each row of 48 elements are removably attached to one of 48 printed circuit boards. FIG. 2 shows a representation of the 48 by 48 channels carrying microvolt analog electrical signals to the printed circuit boards. Each of the 48 PCB boards has 48 amplification circuits 20 which take the microvolt level signals to a volt level signal for further processing. The signals are passed through a low pass filter 21 to filter out high frequency noise, and then to a 10 or 12 bit analog to digital conversion circuit (ADC) 22. The ADC samples the analog electrical signals at 1.5 MHz, or 4 times the frequency of the sonar frequency, giving a digital representation of the sound wave amplitude and phase over the area of each of the 4 by 4 mm area resolution elements of the sonar receiver. The digital data stream from the entire array is 34 Gbits/sec for 10 bit encoders. Each output stream from the ADC 22 is passed to a Quadrature Encoder 23 having a signal input giving the phase of the sent out sonar signals. The output from the Quadrature Encoder 23 is a number for each of the 2304 channels, each number having real and imaginary parts, and each part having 10 bit accuracy. The intensity of the sonar wave is in each 4×4 mm area given by the square root of the sum of the squares of the real and imaginary parts, and the relative phase of the signal is given by the normalized vector sum of the real and imaginary parts. The data is passed to a filter 24 which averages the real and imaginary parts over a 4 cm slice length of the sonar beam and passes the signal to a channel aggregator 25. The aggregator provides Raw Slice Data 26 for submission to the Beamformer section.

FIG. 3 is a flow chart of a treatment of raw data by the beamformer. Decision step 30 sends Raw Data to a Top End 30 beamformer (to a beamformer into the surface vessel 10 or other structure supporting the echoscope), or to a beamformer section 32 in an underwater container (Bottom End) containing the electronics for the raw data collection. A beamformer section in either location receives data about the phase and amplitude of sound waves impinging on each element of the detector array, and calculates the positions in space relative to the detector array from which the measured sound waves were scattered. A Top End beamformer can use much more powerful computers, but the data transmission rate from the array detector to the top end may be too great for efficient and inexpensive data transfer.

The beamformer calculates range and intensity for each slice, and each slice has two orthogonal angular resolution elements and answers the question, "was there a reflection from this three dimensional element?". Then, in general, the beamformer does a ping compression and throws away most of the measured data in a ping compression step 33. One well known compression step 34 is to register only one range for each angular resolution element. Two common compression methods shown are the FAT (first above threshold) method, where the first signal with intensity above a preset threshold determines in which voxel in a particular angular resolution element is recorded, and the MAX compression method, where the maximum intensity returned sonar signal from a particular angular resolution element is used to register the range. Other types of compression techniques 35 use data from neighboring slices to decide whether or not to keep a single or a few data points. A large volume of touching slices and angular resolution elements may be grouped as having no reflections, for example. Data from ping to ping may also be compared to compress the beamformed data if the observed volume changes little from ping to ping.

The beamformed data give a picture of a conical beam with resolution elements in range being the same (eg one slice length of 4 cm), while the two angular resolution elements spatial dimensions increase with range. The beamformed data thus has resolution in two dimensions which increases the closer the objects measured are to the array detector.

Figure 4A:
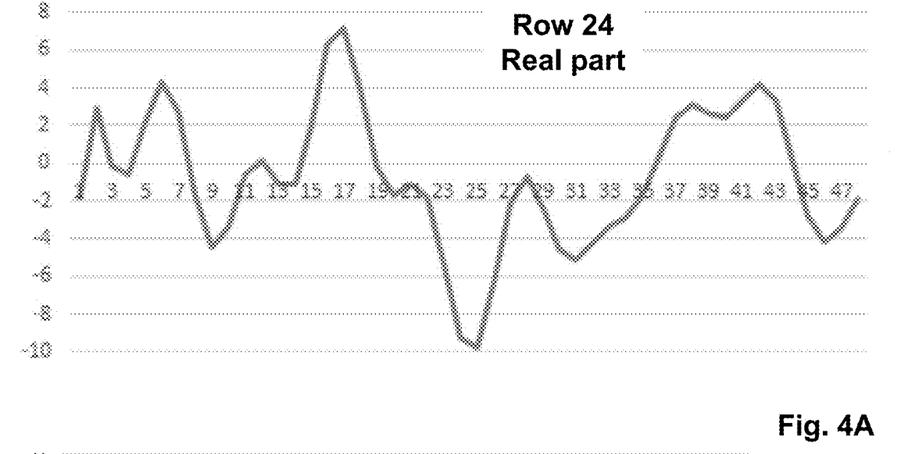
FIGS. 4A-4B shows a raw data digital data record of the real part and the imaginary part of sonar signals calculated for a single row in a single time slice of reflected sound waves.
Figure 4B:
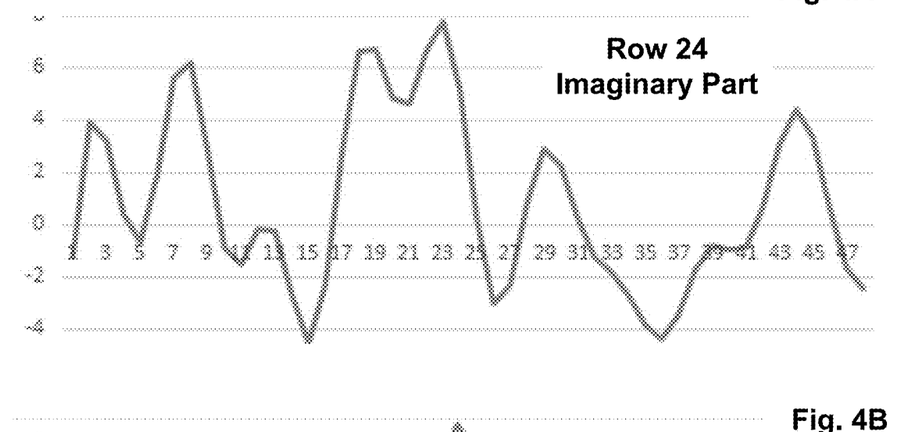
Figure 4C:
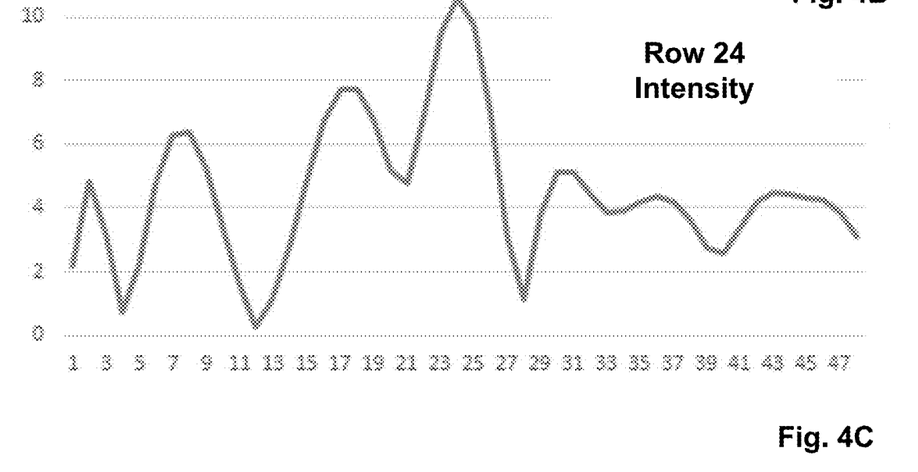
FIG. 4C shows a raw data digital data record of the sound wave intensity calculated for the single row and single slice data of FIGS. 4A and 4B.

FIGS. 4A, 4B, and 4C respectively give the real parts, the imaginary parts, and calculated intensities returned for a single slice and for each element of a single 48 element row of the array detector.

The intensity shown in FIG. 4C is calculated by squaring the real and imaginary parts shown in FIGS. 4A, 4B, and adding them to give intensity of the pulse. The phase of the sound wave at each detector is given by plotting the real part as the x component, and the imaginary part as the y component of a vector. With 10 bit data, the vector provides one of 1024 possible distinct phases of the reflected sound wave by measuring the angle between the vector and the x axis.

Figure 4D:
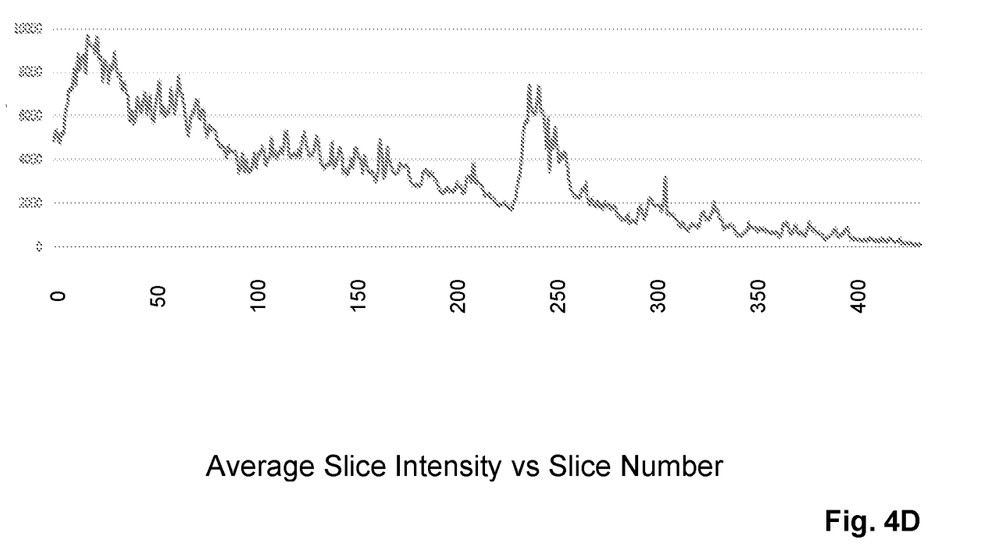
FIG. 4D shows a raw data shows average slice intensity vs slice number (time) for all slices in a single ping.

FIG. 4D gives the sound intensity averaged over all 2304 elements of the array as a function of the slice number from 1 to 457. The peak at about slice 250 was due to the outgoing sound pulse reflecting from a brick wall, which was much more highly reflecting than soft material of the seabed.

Figure 5:
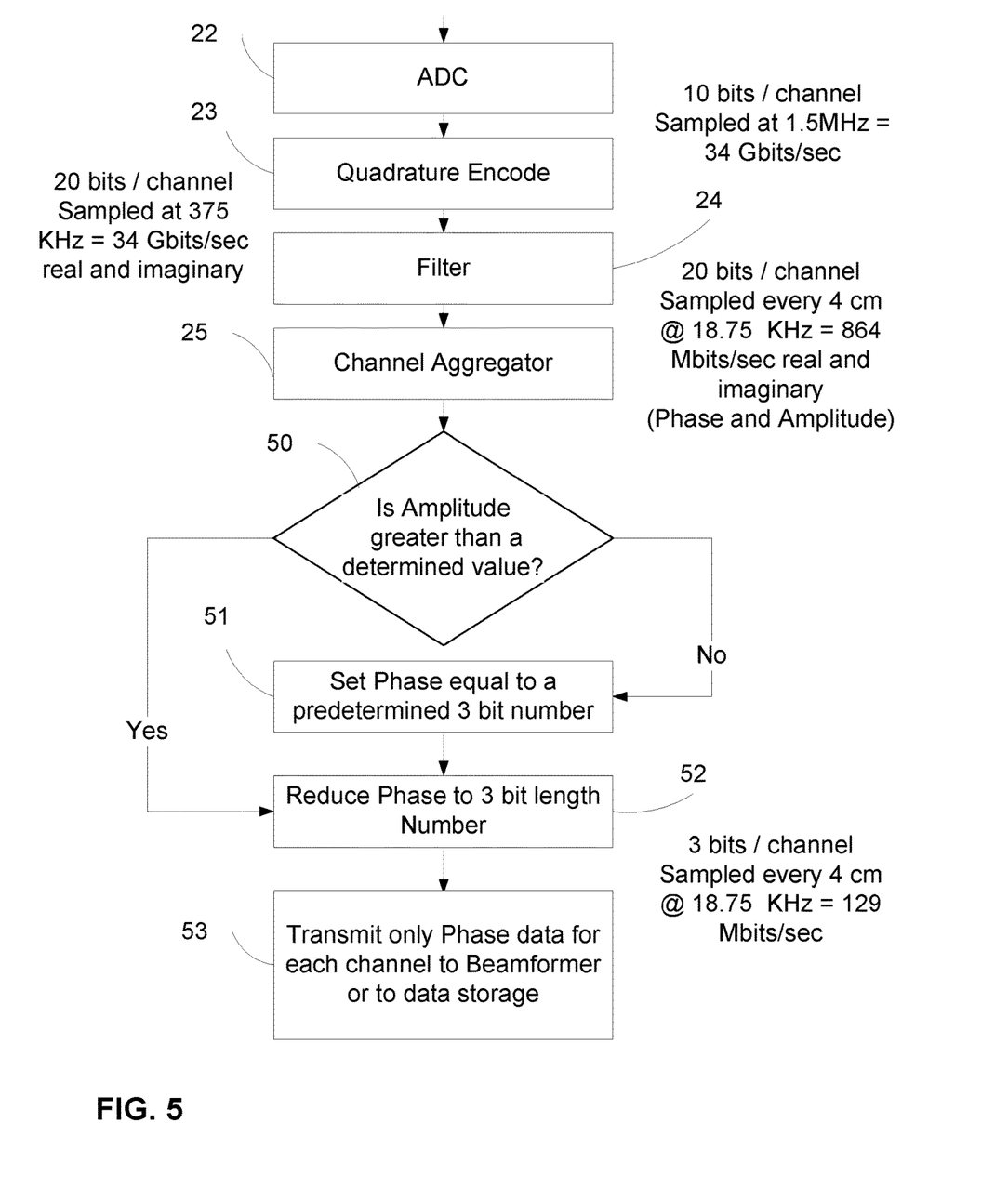
FIG. 5 shows a flow chart for a preferred method of the invention.

FIG. 5 shows a flow chart of a preferred method of the invention. Blocks 22 to 25 are the same as shown in FIG. 2. Block 50 is a decision step, where the signal stream is divided according to the intensity of the sound wave measured for each element. If the intensity is less than a determined value, the phase is arbitrarily set to a predetermined 3 bit length number in step 51. If the intensity is greater than a determined value, the phase is reduced from a 10 bit number to the 3 most significant bit number in step 52. Only the 3 bit length phase numbers for each channel are sent to the beamformer or to storage.

In an innovative step of the invention, for each slice, an arbitrary single intensity is chosen and used for each channel of the 48 by 48 channel array. In an alternative preferred method of the invention, a measuring device separate from the array is used for measuring the reflected sonar intensity and that measurement is transmitted to the beamformer and used instead of the separate intensities measured by each element of the 48 by 48 array. In this way, the amount of data sent to the beamformer is cut in half, and only the phase information from each channel is transmitted to the beamformer.

The inventor has shown that the amount of raw data sent from the raw data section to the beamformer may be drastically reduced, and the beamformed data will still contain significant information.

Figure 6A:
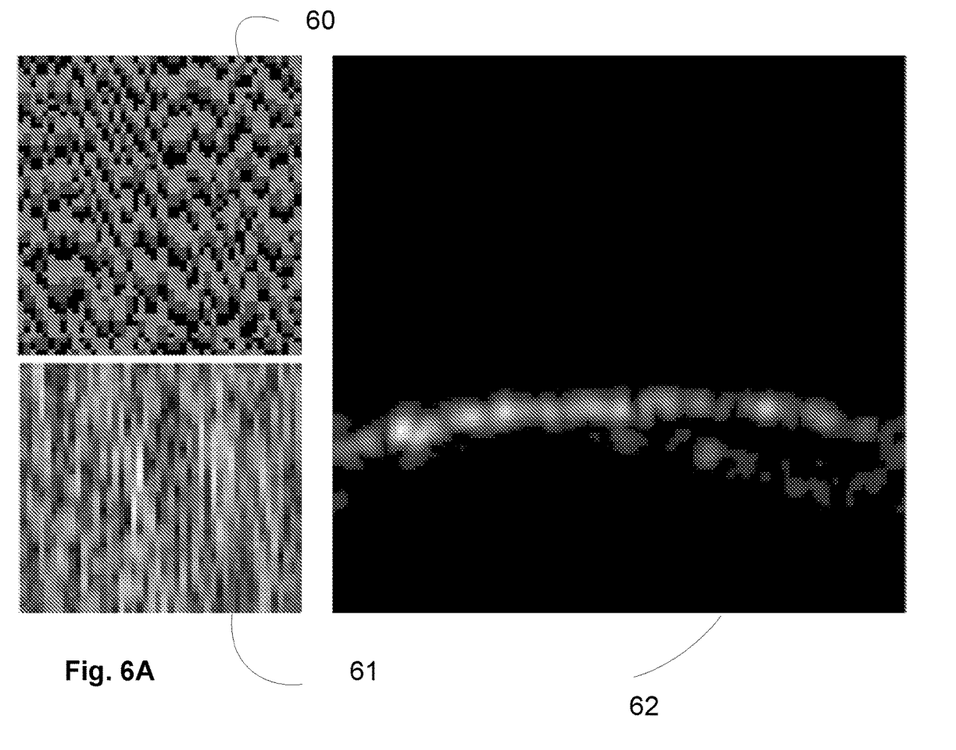
FIG. 6A shows 12 bit raw phase data and intensity raw data recorded for a single slice of reflected sound waves, and image data beamformed from the 12 bit data.
Figure 6B:
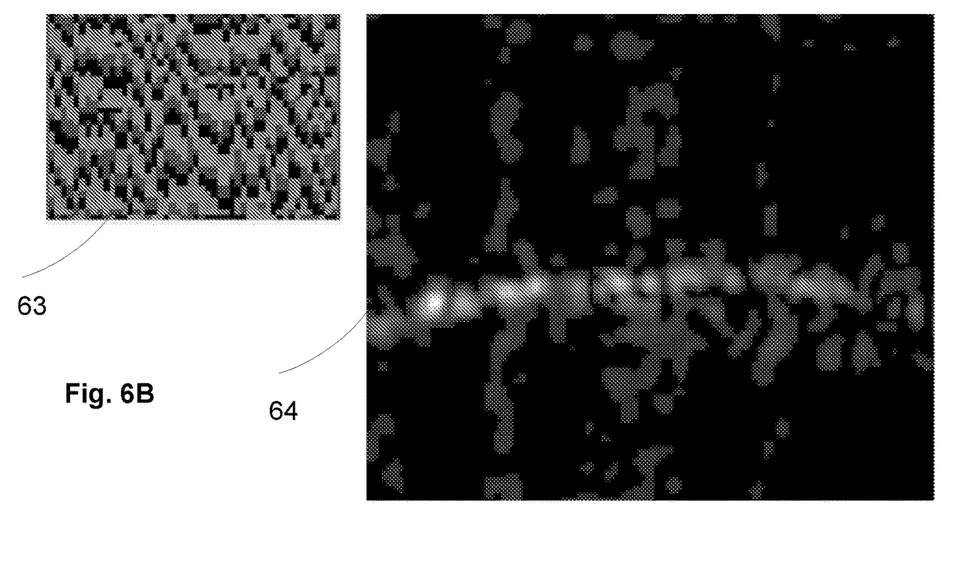
FIG. 6B shows raw data of only 4 phases (ie 2 bits) recorded for a single slice of reflected sound waves, and image data beamformed from the 12 bit data.

FIG. 6A shows a color image 60 of the phase of each of the 48 by 48 detectors for one slice, FIG. 6B shows the intensity 61 for the same slice, and FIG. 6C shows a representation 62 of the sea bed calculated by the beamformer using all the 12 bit real, 12 bit imaginary data. FIG. 6B shows the same slice data reduced to one bit (real, imaginary) where the phase is restricted to one of 4 quadrants and a single number is used for slice intensity.

Figure 7A:
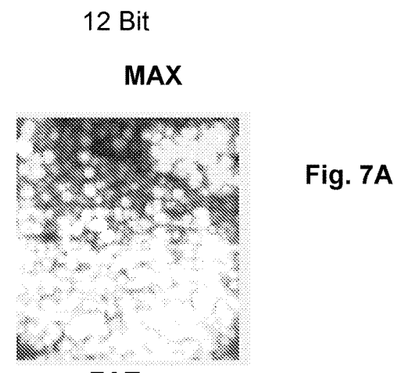
FIGS. 7A and 7B shows beamformed images where 12 bit raw data was beamformed and compressed after beamforming by two compression techniques.
Figure 7B:
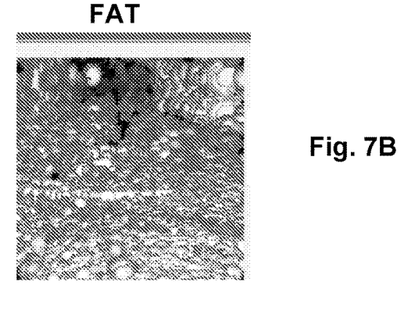
Figure 7C:
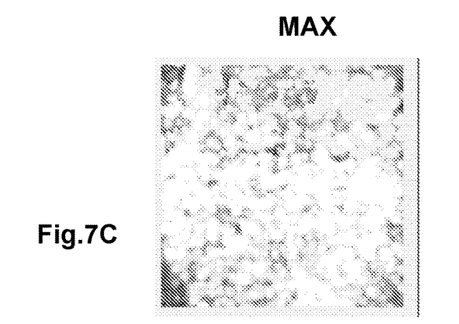
FIGS. 7C and 7D shows beamformed images where 2 bit raw data (4 phases) was beamformed and compressed after beamforming by two compression techniques.
Figure 7D:
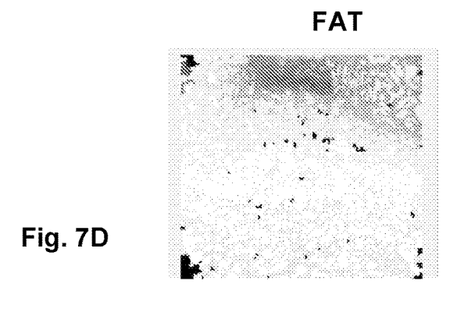

FIGS. 7A and 7B show images calculated from 12 bit beamformed data using MAX and FAT compression of world space data respectively. FIGS. 7C and 7D show the same images using the 4 quadrant phase data only with an arbitrary intensity chosen for each slice.

Figure 8:
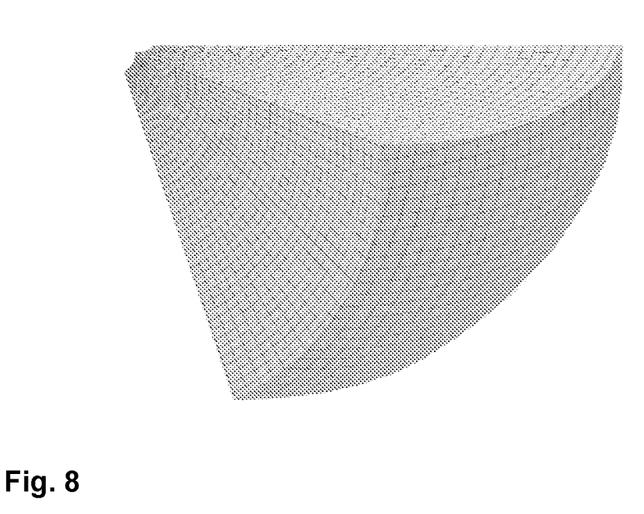
FIG. 8 shows a sketch of the conical space into which the outgoing sonar beam was sent.

The beamformer registers possible reflections coming from each voxel in the drawing of FIG. 8 which is a representation of a ping volume depicted from the detector array at the top left corner, and extending downwardly. The data are then transformed into a normal Cartesian coordinate world space.

The most preferred embodiments of the invention use cheaper comparator circuits instead of more expensive ADC circuits to both record the raw data and to provide a compressed data set for storage or transmission to the Top End.

Figure 9A:
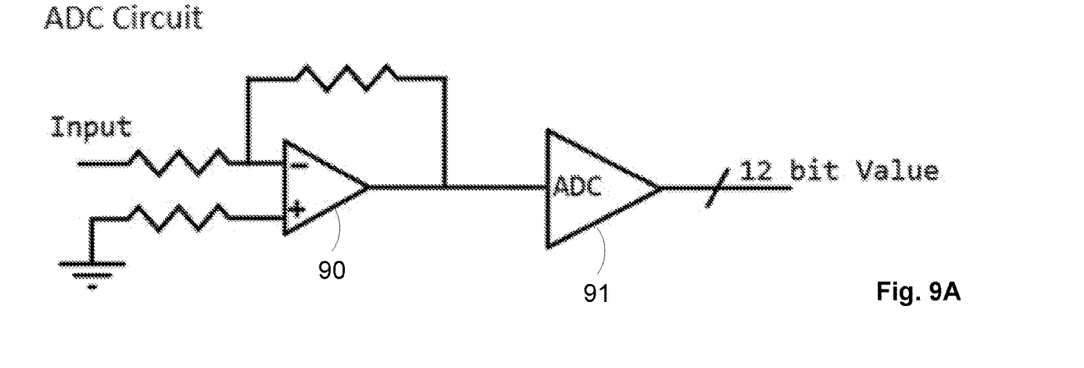
FIG. 9A shows a sketch of the prior art amplifier circuit and ADC of the prior art.
Figure 9B:
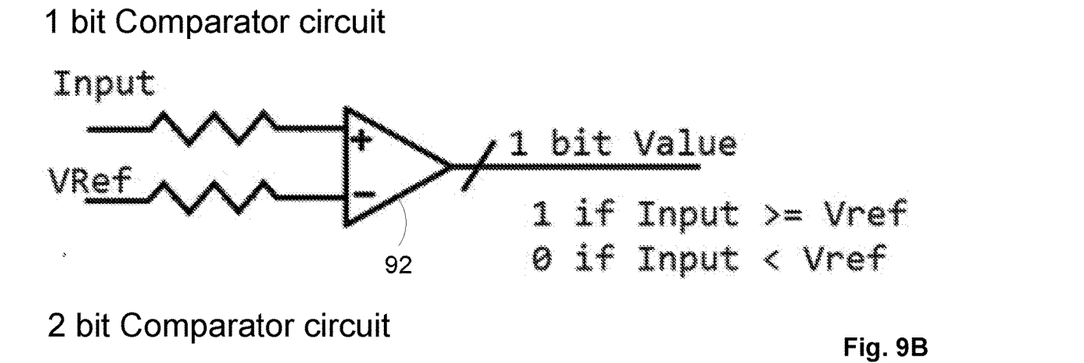
FIG. 9B shows a sketch of one bit comparator circuit of a preferred method of the invention.
Figure 9C:
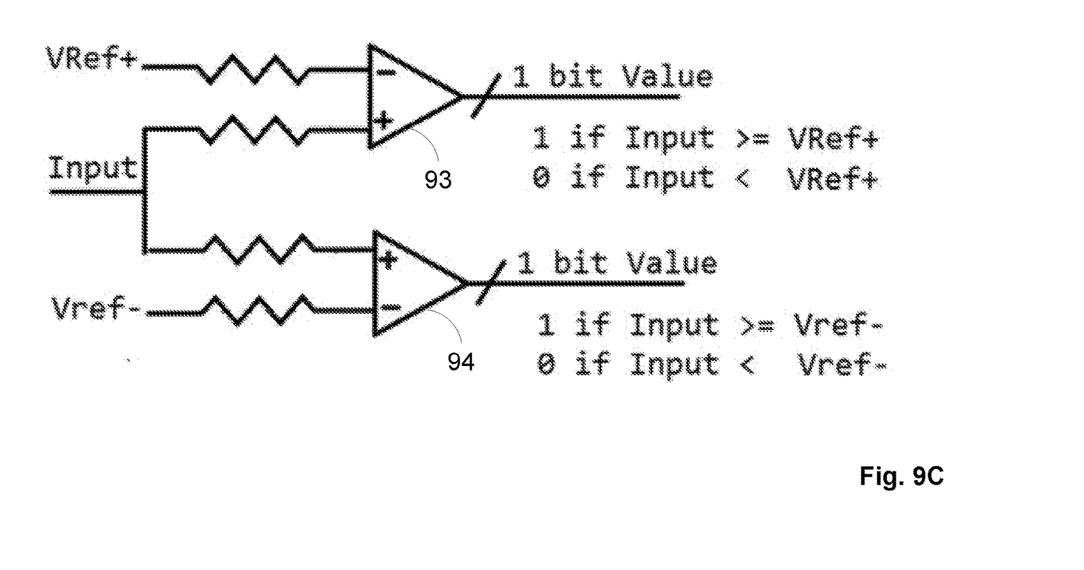
FIG. 9C shows a sketch of one bit (real, imaginary) comparator circuit of a preferred method of the invention.

FIG. 9A shows a circuit diagram of an analog high gain amplifier 90 and ADC circuit 91 of the prior art. FIG. 9B shows a circuit diagram of the amplifier 92 subtracting the dc value Vref of the input signal and returning a one bit square wave representation of the original sinusoidal analog signal. Amplifier 92 returns high and low signals pegged to the maximum output. FIG. 9C shows a dual comparator circuit providing nearly the same square wave as FIG. 9B which is more stable if the input has very small amplitude.

Consider a typical example of insonifying a volume with 375 KHz sound waves. We use a master 375 KHz square wave generator to generate a 375 KHz sine wave which is transmitted from a transmitter as a pulse having a pulse duration of, say 16 375 KHz cycles. As an example, we send out the pulse every 0.1 s. We have an array of 2304 hydrophones arranged as a 48×48 array. Each hydrophone receives the 375 KHz sine wave reflected sound from the insonified volume in front of the transmitter.

We want to work out the phase of the received 375 KHz sine wave signal with respect to the transmitted signal using less expensive components that the 10 or 12 bit ADC circuits of the prior art. In FIGS. 9B and 9C we generate a 4× clock signal from the 375 KHz master square wave to produce a square wave of 1.5 MHz. The 1.5 MHz signal is fed through a 2 bit counter to get a 2 bit number that counts 0,1,2,3 at 375 KHZ.

The numbers can represent the phase of the transmit signal (0,90,180,270) degrees. We amplify and filter the hydrophone signals to produce an analog sine wave with a varying amplitude between V− and V+ around an average value of V0 (Vref) for each hydrophone. We set a value Vref+ which is slightly above Vref, and a value Vref− which is slightly below Vref. If a signal is greater than Vref+ it is deemed to have a value of 1 and if a signal is below Vref− it is deemed to have a value of −1. A signal between Vref− and Vref+ is deemed to have a value of 0. Vref− and Vref+ are both very small compared to the maximum and minimum voltages V− and V+, so a zero is returned rarely. When a zero is returned for both, we arbitrarily set the phase equal to 45 degrees.

Figure 9D:
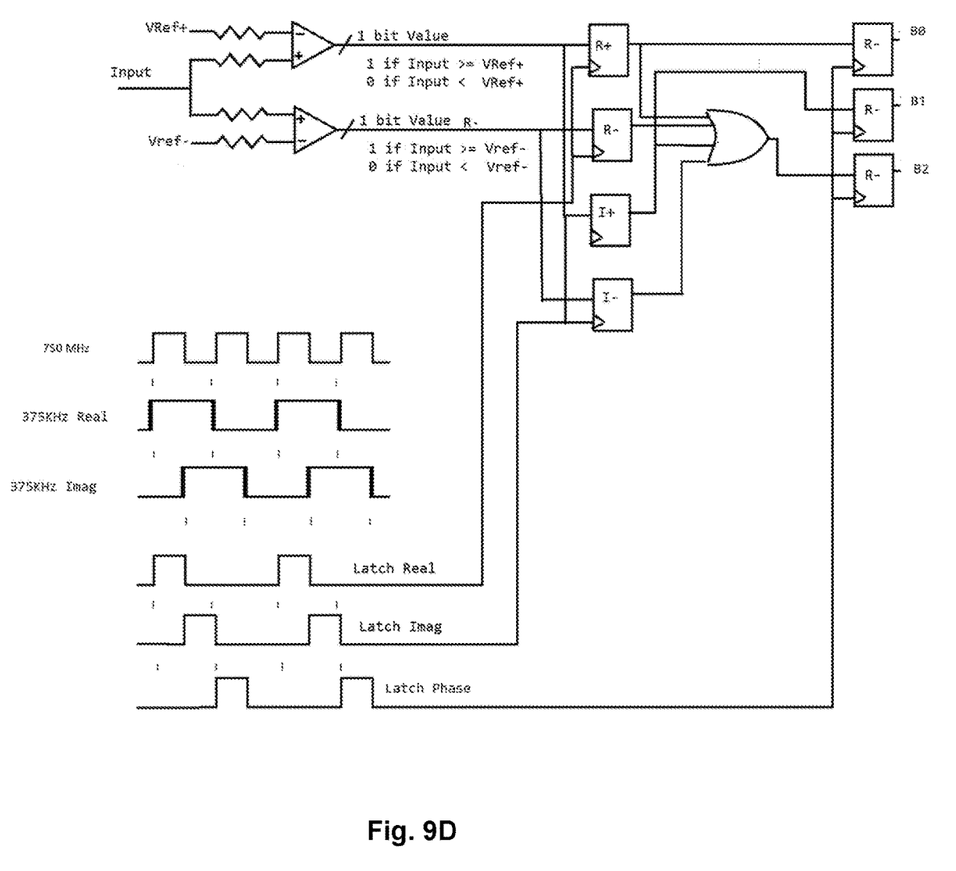
FIG. 9D shows a sketch of the circuit of FIG. 9C with the timing and latch signals.

The comparison of the signal against Vref+ and Vref− is done using two comparators 93 and 94 sketched in FIG. 9D. Comparator 93 outputs 1 if Signal>Vref+. Comparator 94 outputs 1 if Signal<Vref−. Both comparators cannot output 1 at same time. If both comparators output zero, the signal is deemed to have amplitude of 0. The result table below shows the outputs from the dual comparators of FIG. 9C.

| Comp. 93 Output | Comp. 94 Output | Output Magnitude |
|---|---|---|
| 0 | 0 | 0 |
| 1 | 0 | 1 |
| 0 | 1 | −1 |
| 1 | 1 | X (not possible) |

Figure 10:
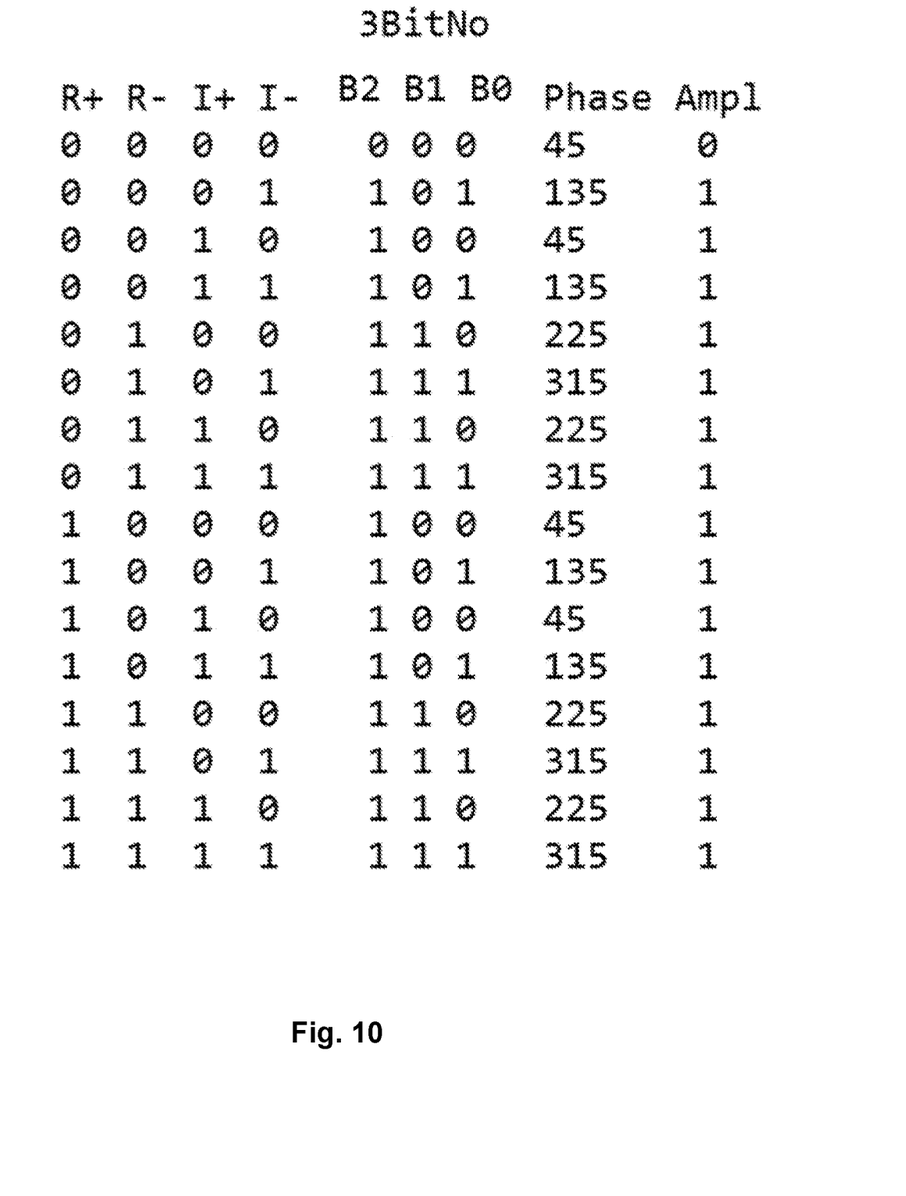
FIG. 10 shows the inputs and outputs of the circuit of FIG. 9D showing the 4 phases returned by the circuitry.

The circuit of FIG. 9D is used to output the phase of the signal returned to each hydrophone as a 3 bit number B0, B1, B3. The real and imaginary parts and the phase angles are shown in FIG. 10.

We wish to sample a Real and Imaginary value each cycle of the 375 KHz received sound wave. The Imaginary Value is 90 degrees out of phase with respect to the Real Value.

The Register Blocks (R+,R−,I+ and I−) of FIG. 9D will sample and hold their input Value on a positive edge transition of their Latch/Clock input. So if we sample the signal at 0 degrees then that is the real part (Latch Real) (R+ and R−). If we sample the signal at 90 degrees then that is the Imaginary part (Latch Imag) (I+ and I−). We can determine the Phase of the signal using just the Values of R+ and I+. If any of the values (R+,R−,I+,I−) are 1 then the Amplitude is 1. Conversely the amplitude is only zero if (R+,R−,I+,I−) are all 0. Once we have all three bits(R+, I+ and Amplitude) we latch them using the Latch Phase Clock. Therefore we get a distinct phase value at 375 KHz. Note that all the 16 possible values of the 4 bit numbers returned shown in FIG. 10 are limited to just 4 phases, which can be described in just two bits of transmitted information. The values R+ and I+ define the Phase (2 bits, 4 values).

| Phase table for two bit output | | | |
|---|---|---|---|
| R+ | I+ | Phase | Quadrant |
| 0 | 0 | 45 | 0 |
| 1 | 0 | 135 | 1 |
| 1 | 1 | 225 | 2 |
| 0 | 1 | 315 | 3 |

The two bit, four phase data are then sent to the beamformer to calculate the positions of the reflecting objects or sea bed.

Figure 11:
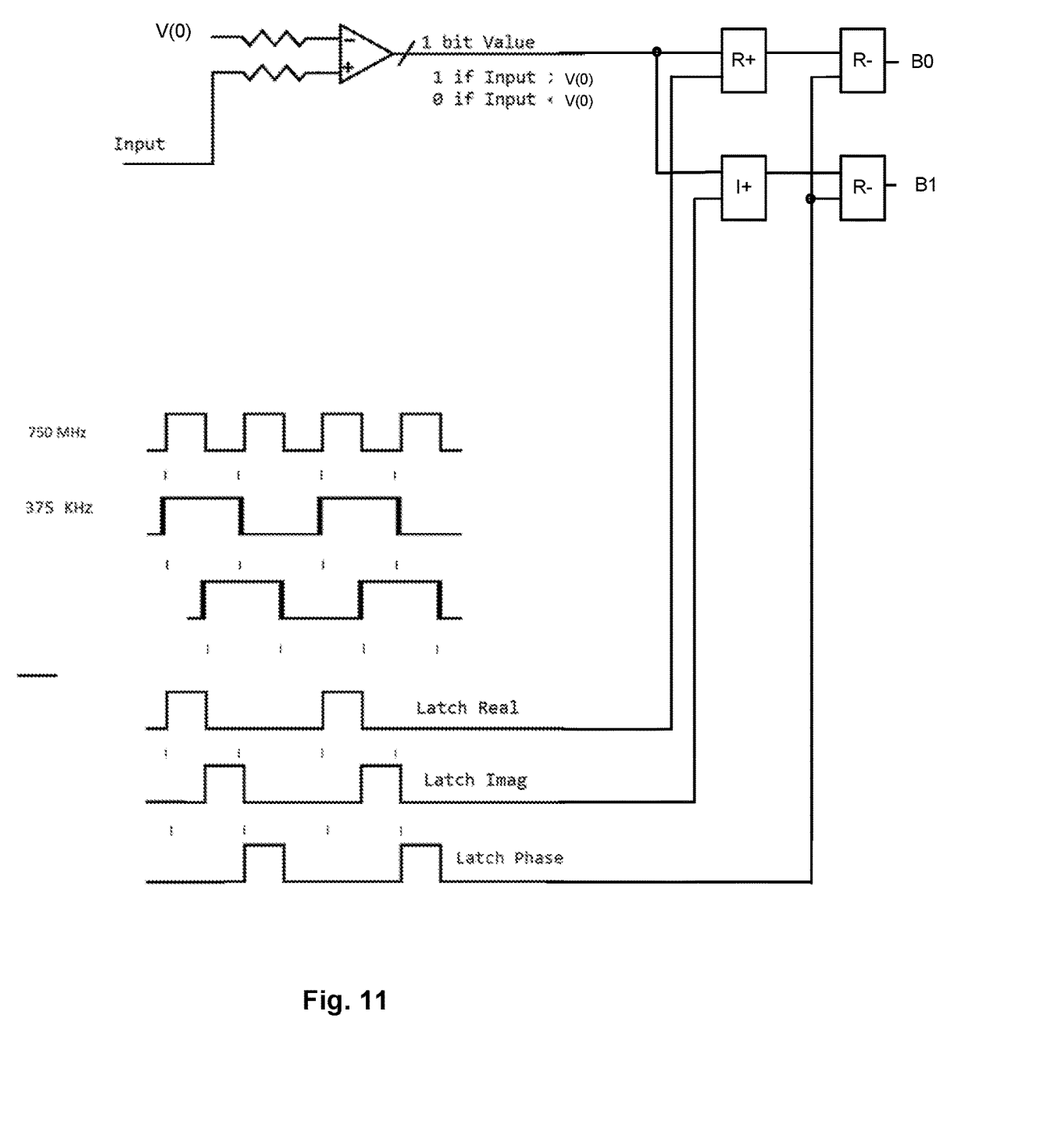
FIG. 11 shows a sketch of the circuit of FIG. 9B with the timing and latch signals used to produce just two phases for transmission to the beamformer or to send to storage.

FIG. 11 shows the most preferred circuit of the invention, where the circuit of FIG. 9B is shown which produces just one bit of data for transmission to the beamformer. In this circuit, only the information of the imaginary part of the square wave signal is transmitted. If positive, the phase is between 0 and 180 degrees, and if negative, the phase is between 180 and 360 degrees with respect to the sent out sonar signal.

An innovative addition to the method of the invention is to make one intensity measurement for each slice, and transmit that measurement to the beamformer. Since there is little extra data to worry about, the intensity measurement can be sent as 16, 12, 10 or fewer bits. The intensity may be measured by a separate hydrophone, or by measuring the intensity returned by a small number of the hydrophones of the array. The area of a separate hydrophone is advantageously between 2 and 9 times the area of each of the hydrophones of the array 19. Alternatively, a 2 by 2 or a 3 by 3 block of hydrophones may have additional signal lines connected to an addition circuit and an ADC to produce the intensity signal.

Obviously, many modifications and variations of the present invention are possible in light of the above teachings. It is therefore to be understood that, within the scope of the appended claims, the invention may be practiced otherwise than as specifically described.

I claim:
1. A method, comprising:
   a) insonifying a volume of fluid, wherein the volume of fluid contains zero or more objects, and wherein the volume of fluid is insonified with one or a series of outgoing sonar pings, each outgoing sonar ping having a ping time $t_P$, wherein the ping time $t_P$ determines a ping length $l_P$, wherein each sonar ping has a ping frequency $f_P$, wherein the ping frequency $f_P$ may change during the duration of the ping time tp; and then
   b) receiving reflected sonar signals reflected from one or more objects of the zero or more objects for each of the one or a series of pings, wherein the reflected sonar signals are received by a large array of hydrophones, and wherein each of the large array of hydrophones produces an electrical analog signal which measures the pressure vs time of the sonar signal received by each of the large array of hydrophones; and then
   c) converting the electrical analog signals to provide a raw data digital record of the electrical analog signals;
   d) wherein the reflected sonar signals have a ping length $l_P$, wherein the ping length $l_P$ is divided into a number of ping slices, each ping slice having a slice length $l_S$, wherein $l_S$ is determined by a specified resolution, and wherein the raw data digital record includes a relative phase $\theta_{ijS}$ of the received sonar signals referenced to a phase of a part of the outgoing sonar ping, and wherein the relative phase $\theta_{ijS}$ is recorded for each hydrophone i, j and each ping slice, the relative phase $\theta_{ij\ S}$ represented by a single digital number for each ping slice and each hydrophone, and wherein $\theta_{ij\ S}$ is a digital number with bit length less than 4, and then either;
   i) storing the raw data digital record in a computer readable storage device, or;
   ii) transmitting the raw data digital record to a sonar image beamformer.

2. The method of claim 1, wherein the large array of hydrophones is arrayed as a two dimensional planar array having m by n elements, where both m and n are greater than 24.

3. The method of claim 1, wherein the raw data digital record includes a slice amplitude represented by a single digital number for each ping slice.

4. The method of claim 3, wherein the slice amplitude is measured using a hydrophone or group of hydrophones of equal or greater area than the area of a single hydrophone making up the large array of hydrophones.

5. The method of claim 4, the slice amplitude is measured using a hydrophone or group of hydrophones of area between two and nine times the area of a single hydrophone making up the large array of hydrophones.

6. A method, comprising:
   a) insonifying a volume of fluid, wherein the volume of fluid contains zero or more objects, and wherein the volume of fluid is insonified with one or a series of outgoing sonar pings, each outgoing sonar ping having a ping time $t_P$, wherein the ping time t, determines a ping length $l_P$, wherein each sonar ping has a ping frequency $f_P$, wherein the ping frequency $f_P$ may change during the duration of the ping time tp; and then
   b) receiving reflected sonar signals reflected from one or more objects of the zero or more objects for each of the one or a series of pings, wherein the reflected sonar signals are received by a large array of hydrophones, and wherein each of the large array of hydrophones produces an electrical analog signal which measures the pressure vs time of the sonar signal received by each of the large array of hydrophones; and then
   c) converting the electrical analog signals to provide a raw data digital record of the electrical analog signals;
   d) wherein the reflected sonar signals have a ping length $l_P$, wherein the ping length $l_P$ is divided into a number of ping slices, each ping slice having a slice length $l_S$, wherein $l_S$ is determined by a specified resolution, and wherein the raw data digital record includes a relative phase $\theta_{ijS}$ of the received sonar signals referenced to a phase of a part of the outgoing sonar ping, and wherein the relative phase $\theta_{ijS}$ is recorded for each hydrophone i, j and each ping slice, the relative phase $\theta_{ijS}$ represented by a single digital number for each ping slice and each hydrophone, and wherein $\theta_{ijS}$ is a digital number with bit length less than 3, and then either;
   i) storing the raw data digital record in a computer readable storage device, or;
   ii) transmitting the raw data digital record to a sonar image beamformer.

7. The method of claim 6, wherein the step c) converting the electrical analog signals to provide a raw data digital record of the electrical analog signals is carried out with comparator circuit technology.

8. A method, comprising:
   a) insonifying a volume of fluid, wherein the volume of fluid contains zero or more objects, and wherein the volume of fluid is insonified with one or a series of outgoing sonar pings, each outgoing sonar ping having a ping time $t_P$, wherein the ping time t, determines a ping length $l_P$, wherein each sonar ping has a ping frequency $f_P$, wherein the ping frequency $f_P$ may change during the duration of the ping time tp; and then
   b) receiving reflected sonar signals reflected from one or more objects of the zero or more objects for each of the one or a series of pings, wherein the reflected sonar signals are received by a large array of hydrophones, and wherein each of the large array of hydrophones produces an electrical analog signal which measures the pressure vs time of the sonar signal received by each of the large array of hydrophones; and then
   c) converting the electrical analog signals to provide a raw data digital record of the electrical analog signals;
   d) wherein the reflected sonar signals have a ping length $l_P$, wherein the ping length $l_P$ is divided into a number of ping slices, each ping slice having a slice length $l_S$, wherein $l_S$ is determined by a specified resolution, and wherein the raw data digital record includes a relative phase $\theta_{ijS}$ of the received sonar signals referenced to a phase of a part of the outgoing sonar ping, and wherein the relative phase $\theta_{ijS}$ is recorded for each hydrophone i, j and each ping slice, the relative phase $\theta_{ijS}$ represented by a single digital number for each ping slice and each hydrophone, and wherein $\theta_{ijS}$ is a measured with comparator technology to be a digital number with bit length less than 4, and then either;
   i) storing the raw data digital record in a computer readable storage device, or;
   ii) transmitting the raw data digital record to a sonar image beamformer.

* * * * *